(12) United States Patent
Ferragina et al.

(10) Patent No.: US 12,253,970 B2
(45) Date of Patent: Mar. 18, 2025

(54) COMPRESSION AND SEARCH PROCESS ON A DATA SET BASED ON MULTIPLE STRATEGIES

(71) Applicant: UNIVERSITA' DI PISA, Pisa (IT)

(72) Inventors: Paolo Ferragina, Pisa (IT); Giovanni Manzini, Pisa (IT); Giorgio Vinciguerra, Pisa (IT)

(73) Assignee: UNIVERSITA' DI PISA, Pisa (IT)

( * ) Notice: Subject to any disclaimer, the term of this patent is extended or adjusted under 35 U.S.C. 154(b) by 295 days.

(21) Appl. No.: 17/938,626

(22) Filed: Oct. 6, 2022

(65) Prior Publication Data

US 2024/0119027 A1 Apr. 11, 2024

(51) Int. Cl.
G06F 16/14 (2019.01)
G06F 16/16 (2019.01)
G06F 16/174 (2019.01)

(52) U.S. Cl.
CPC ............ G06F 16/14 (2019.01); G06F 16/164 (2019.01); G06F 16/1744 (2019.01)

(58) Field of Classification Search
CPC ..... G06F 16/14; G06F 16/164; G06F 16/1744
See application file for complete search history.

(56) References Cited

U.S. PATENT DOCUMENTS

| 6,708,166 B1* | 3/2004 | Dysart | G06F 16/289 |
| | | | 707/999.005 |
| 2004/0001543 A1* | 1/2004 | Adams | H03M 7/40 |
| | | | 375/240 |
| 2009/0060047 A1* | 3/2009 | Schneider | H03M 7/40 |
| | | | 375/240.23 |
| 2013/0073529 A1* | 3/2013 | Aronovich | G06F 3/0641 |
| | | | 707/E17.005 |
| 2020/0366315 A1* | 11/2020 | Sun | H03M 7/6082 |
| 2021/0157975 A1* | 5/2021 | Gelosi | G06F 40/166 |
| 2022/0334725 A1* | 10/2022 | Mertes | G06F 16/275 |

OTHER PUBLICATIONS

Singh et al. 2019, "Analysis of Encryption and Lossless Compression Techniques for Secure Data Transmission" (Year: 2019).*

* cited by examiner

*Primary Examiner* — Matthew J Ellis
(74) *Attorney, Agent, or Firm* — Vorys, Sater, Seymour and Pease LLP

(57) ABSTRACT compression and search process on a data set based on multiple strategies, including: extracting a set of raw data and transforming it into a sequence of symbols, manipulating the sequence by combining data structures and one or more (optionally a multiplicity of) compression strategies to obtain compressed and efficiently searchable data, recording the compressed and efficiently searchable data on storage media.

18 Claims, No Drawings

COMPRESSION AND SEARCH PROCESS ON A DATA SET BASED ON MULTIPLE STRATEGIES

TECHNICAL FIELD OF THE INVENTION

The present invention relates to a compression and search process on a data set based on multiple strategies.

DESCRIPTION OF PREVIOUS TECHNIQUE

In computer science, a data structure is an entity used to organize a set of data within the computer's memory, and eventually to store it in a mass storage device, with the aim of supporting certain operations efficiently in time and space. The choice of data structures to be used is therefore closely linked to that of the algorithms that use them, which is why they are often considered together. Indeed, the choice of a data structure inevitably affects the computational efficiency of the algorithms that manipulate it.

The data structures differ mainly according to the operations that can be performed on them, and the performance offered.

The advent of big data and real-time applications has posed new challenges to developers tasked with designing systems to support efficient access to the huge amounts of data increasingly present in sectors such as fintech, biotech, IoT and digital media, to name but a few.

Consequently, recent years have seen a massive development of non-relational databases, known as NoSQL, in addition to traditional relational databases. In fact, non-relational databases have been developed with the intention of replacing traditional ones in cases where the latter are inadequate for the type of operations to be supported, thus achieving better performance in both time and space. A noteworthy implementation of the NoSQL approach has been carried out by Google with the Bigtable system, at the heart of many of its services.

Following the success of Bigtable, other major companies have developed efficient data management systems optimized for scalability, multicore processing and use in the cloud. Among the latter, two popular open-source products are Redis and RocksDB, the latter developed and maintained by Facebook. Basically, these systems are called "key-value stores", i.e., they are based on a dictionary structure: each stored value is matched with a unique key that allows it to be retrieved. An analysis of the open-source code of the most widespread solutions shows that they perform operations using dated techniques, such as binary search and skip lists (W. Pugh, Comm. ACM, 1990), thus ignoring some recent developments in data compression and the design of advanced (and possibly compressed) data structures. In particular, such recent developments have shown how the operations of counting and selecting elements of an ordered set can be effectively supported using two powerful primitives called respectively rank and select (G. Jacobson, Proc. IEEE FOCS, 1989). These primitives also form the basis of more complex operations such as, for example, filtering data in a database using logical predicates, join operations between two or more tables, as well as operations of the type: search by key, by predecessor, or by range. In addition to time efficiency, the modern SQL and NoSQL databases also aim at space efficiency as they are often deployed on shared servers in the cloud.

These techniques have some important drawbacks: in some cases they offer time efficiency, but do not compress the input data (e.g. skip list, B-tree, etc.); in other cases, they manage to combine time efficiency and space compression (thanks to the use of the rank/select primitives), but leave room for further improvement as they are unable to efficiently exploit the different types of regularities that real data may present.

SUMMARY OF THE INVENTION

In this situation, the technical task at the heart of the present invention is to devise a compression and search process on a data set based on multiple strategies to substantially obviate at least some of the aforementioned drawbacks.

Within this technical task, it is an important aim of the invention to obtain a compression and search process on a data set based on multiple strategies that efficiently and effectively finds and exploits the repetitiveness present in the input data in order to compress them.

Another important aim of the invention is to realize a compression and search process on a data set based on multiple strategies that provides efficient performance both in terms of space occupancy and in terms of the time required to search the data.

The specified technical task and purposes are achieved by a compression and search process on a data set based on multiple strategies comprising: extracting a set of raw data and transforming it into a sequence of symbols, manipulating said sequence by combining data structures and one or more (optionally a multiplicity of) compression strategies to obtain compressed and efficiently searchable data, recording said compressed and efficiently searchable data on storage media.

DESCRIPTION OF THE PREFERRED EMBODIMENTS

If and when used, terms such as "first", "second", "upper", "lower", "main" and "secondary" do not necessarily identify an order, priority of relationship or relative position, but can simply be used to more clearly distinguish different components from each other.

Unless otherwise specified in the following discussions, terms such as "processing", "computing", "determination", "calculation", or similar, are considered to refer to the action and/or processes of a computer or similar electronic computing device that manipulates and/or transforms data represented as physical quantities, such as electronic quantities of a computer system's records and/or memories into other data similarly represented as physical quantities within computer systems, records or other information storage, transmission or display devices.

The compression and search process on a data set based on multiple strategies, which is the subject of the present invention, is configured to be implemented and then carried out by a computer.

The invention thus introduces a computer program comprising instructions which, when executed by a computer, enable the same computer to perform the compression and search process.

The invention introduces a data processing system comprising means for implementing the compression and search process. In particular, it introduces computer readable storage means comprising instructions which, when executed by said computer, enable the computer to perform the compression and search process.

The process involves a sequence of steps:
extracting a set of raw data from a source, selecting said raw data by eliminating any errors and obtaining a sequence of symbols, manipulating said sequence by combining data structures and one or more (optionally a multiplicity of) compression strategies (e.g., known or specially designed for the purpose here described) to obtain compressed and efficiently searchable data, recording said compressed and efficiently searchable data on archiving media.

As far as "manipulation" is concerned, it comprises the following steps performed on the said sequence of symbols:

(a) organizing and in particular subdividing said sequence into blocks, possibly of different lengths, which correspond to sub-sequences of said sequence;

(b) deleting one or more of said blocks whose content is a copy of some other sub-sequence of said sequence, and storing a deletion association between the deleted block and that said sub-sequence having the same content;

(c) dividing each of the remaining blocks into sub-blocks, possibly of a predefined or variable number, and of a predefined or variable length, replacing the block with the parent-child relationship between it and its sub-blocks;

(d) considering the sub-blocks obtained in the previous step as "blocks" and appropriately repeating steps (b)-(c) until all remaining blocks reach a given (preferably predefined) length, possibly equal to one;

(e) for each block of any length created in the preceding steps, evaluating a cost function defined in terms of the block itself, the sub-blocks descending from it, and one or more (optionally a plurality of) compression strategies (e.g., known or specially designed for the purpose here described), and possibly in terms also of multi-criteria methods that take into account at least one performance metric (such as memory usage, time efficiency, energy consumption, just to mention a few), and/or the frequency of access to symbols or sub-sequences, or any other set of parameters that allows for further customization of the compression strategies to the needs of the application or user;

(f) pruning and compressing ulteriorly said tree-shaped data structure in order to optimize the cost assessed in step (e), by compressing certain blocks with one or more (optionally a multiplicity of) compression strategies (e.g., known or specially designed for the purpose here described), and consequently deleting all sub-blocks descending from said compressed blocks;

(g) providing algorithms to access and search the compressed representation of said sequence by means of the association of phase (b), the parent-child relationship of phase (c), and the decompression strategies provided by the compressors chosen in phase (f), possibly without decompressing the entire block so as to ensure efficiency in time and space.

In at least one of the steps (a)-(g), algorithms and data structures may be introduced to allow the insertion, deletion and modification of symbols in that sequence. In detail, raw data may be extracted from a source (which, by way of example, may be a data lake, or a data warehouse) and transformed into a sequence of symbols for subsequent steps, possibly subjecting said raw data to a selection phase configured to eliminate any errors such as redundant data, incomplete or incorrect data.

The sequence can represent an ordered dictionary A of n distinct integers. In such a case, the said compressed and efficiently searchable data will preferably support the following operations: rank(x), which returns the number of elements in A which are less than or equal to x, and select(i), which returns the i-th smallest element in A. Furthermore, the subsequent manipulation (detailed below) to obtain the compressed and efficiently searchable data will preferably be performed on a string $S[1, n]$ obtained from said ordered dictionary $A[1, n]$ as $S[i]=A[i]-A[i-1]$, with $A[0]=0$.

Alternatively, the sequence may represent a string X of symbols taken from an alphabet E. In such a case, the said compressed and efficiently searchable data will preferably support the following operations: the retrieval of individual symbols or strings of contiguous symbols in X, the operation $rank_a(i)$, which returns the number of occurrences of the symbol a in $X[1, i]$, and $select_a(j)$, which returns the position of the j-th occurrence of the symbol a in X.

Alternatively or additionally, the sequence may be derived from one-dimensional data (in a preferred non-limiting example, chosen from: time series, text, postings list, memory location offsets), or multi-dimensional data (in a preferred non-limiting example, chosen from matrixes or images) transformed into a sequence in some manner such as, but not limited to, by arranging its elements row by row or column by column or through space filling curves. In such a case, the said compressed and efficiently searchable data will preferably support operations congruent to the source data (e.g., in the case of matrixes, the retrieval of an element, a row, a column or a submatrix).

The manipulation of said sequence of symbols in steps (a)-(g) is performed in such a way as to obtain compressed and efficiently searchable data via the algorithms in step (g). The compressed and efficiently searchable data is subsequently recorded to storage media which may include internal or mass storage, or cloud storage media.

In particular, the manipulation combines: a repetition-based compression approach of the block tree type (the detail is given in the article by Belazzougui, Cáceres, Gagie et al: "Block trees", Journal of Computer and System Sciences, 2021); one or more (optionally a multiplicity of) compression strategies (e.g., known or specially designed for the purpose here described) applicable to said sequence or its sub-sequences, one of which in a preferred non-limiting implementation example is identifiable in LA-vector type compression for sequences of integers (the detail is given in the article by Boffa, Ferragina, Vinciguerra: "A learned approach to quicken and compress rank/select dictionaries", in Proceedings of the SIAM Symposium on Algorithm Engineering and Experiments, ALENEX, 2021); finally, such a combination involves an optimization process based on a cost function that selects and applies the best compression strategy appropriately chosen from one or more of the aforementioned strategies (optionally a multiplicity of the aforementioned strategies) to each individual sub-sequence of said sequence, possibly different among each of them.

In what follows, we further detail steps (a)-(g) by referring to the simplest case of blocks of equal and fixed length at each level of the tree structure described above; but the proposal is not limited to these as it is easily extendable to other types of block subdivisions of different lengths, even varying within the same partition, and commented on below.

The sequence of symbols obtained from the raw data is subdivided into blocks by step (a), which are subsequently eliminated in step (b) if their content (identifiable in a sub-sequence of said sequence) is an exact copy of a different sub-sequence of said sequence, possibly extending over two other blocks. Furthermore, for the purpose of subsequent recovery of the content of any of the deleted blocks, an association between a deleted block and the respective sub-sequence having the same content may be stored at this stage. The storage of such an association may be done, for example, through the use of an explicit pointer, or through the use of appropriate succinct or compressed data structures.

Once the step (b) has been performed, the process continues with the step (c), which consists of dividing the blocks not eliminated in the previous step into smaller sub-blocks of equal and predetermined length. In this phase, each of the blocks thus divided is replaced by a parent-child relationship with the sub-blocks derived from it. The storage of this relationship can be done, for example, through the use of an explicit pointer, or through the use of appropriate succinct or compressed data structures.

Once the step (c) has been performed, the process continues with the step (d), which consists of considering the sub-blocks obtained in the previous step as "blocks" and repeating the steps (b)-(c) until all remaining blocks reach a given length, possibly equal to one.

Once the step (d) has been performed, the process continues with the step (e), which consists of taking each block of any length created in the previous steps and evaluating a cost function defined in terms of the block itself, the sub-blocks descending from it, and one or more (optionally a plurality of) compression strategies (e.g. known or specially designed for the purpose here described) applied to the content of each individual block or the content of each individual sub-block descending from it. As an example, if a block contains an ordered sequence of integers, it is possible to define a cost function that evaluates the compression efficacy or the decompression efficiency of that block by means of an approach such as the LA-vector mentioned above, or an approach that applies a statistical or an integer-specific compressor (with variable length encodings) on the differences between consecutive integers. The choice among these compressors may be different at each block and sub-block depending on its content and the cost function mentioned above.

The cost function, possibly multi-criteria, takes into consideration at least one performance metric (such as memory usage, time efficiency, energy consumption, etc.), and/or the frequency of access to symbols or sub-sequences, or any other set of parameters that allows for further customization of the compression strategies according to the needs of the application or user.

Once the step (e) has been performed, the process continues with the step (f), which consists of compressing the content of the blocks with the compression strategy that optimizes the cost evaluated in step (e), consequently eliminating the sub-blocks descending from the compressed ones in the tree structure.

Once the step (f) has been performed, the process continues with the step (g), in which algorithms are introduced to efficiently access and query the compressed representation of said sequence via the association of the step (b), the parent-child relationship of the step (c), and the decompression strategies provided by the compressors chosen at the step (f), possibly without decompressing the entire block so as to guarantee efficiency in time and space.

As an application example of the process just described, let us consider having obtained from the raw data a sequence of symbols representing an ordered dictionary A of n distinct elements drawn from the universe of integers $[u]=\{0 \ldots, u-1\}$. Suppose we wish to support the operation rank(x), which returns the number of elements in A that are less than or equal to x, and the operation select(i), which returns the i-th smallest element in A. Since A is an ordered array A[1, n] the element A[i] may be obtained by select(i).

Suppose we also want to exploit the known LA-vector compression strategy (mentioned above). In such a strategy, each element A[i] is initially mapped to a point (i, A[i]) belonging to the Cartesian plane, for i=1, 2, . . . , n. Intuitively, one may consider any function $f$ that passes through all these points as an encoding of A, since it is possible to obtain A[i] by evaluating $f$ (i). The function $f$ can be implemented via a piecewise linear ε-approximation as described by Boffa, Ferragina and Vinciguerra in the above-mentioned paper. Alternatively, the function $f$ can be implemented via a non-linear model.

The model, linear or non-linear, can admit an error measured as the vertical distance between the value estimated by the model and the actual value of A and is related to the integer parameter ε. In this case, a piecewise linear ε-approximation of the array A[1, n] is a partition of the set $\{1, \ldots, n\}$ such that each element A[k] of a partition A[i, j] is covered by a segment of the piecewise linear ε-approximation model represented by a pair of reals <α, β> such that $|\alpha k+\beta)-A[k]|\leq \varepsilon$ for each value k between i and j, including extremes.

Of all the possible piecewise linear ε-approximations, it is preferable to use the most succinct one, i.e., the one with the smallest number of segments. This is a computational geometry problem that admits an algorithm of time complexity O(n) in the worst case, as demonstrated in the article by Boffa et alii already mentioned. LA-vector uses this succinct piecewise linear ε-approximation to represent A and complements this information by storing the vertical errors in an array C of integers taking $\lceil \log(2\varepsilon+1)\rceil$ bits each, called corrections (here and in the following, the logarithmic function is assumed to be in base 2).

To implement operation select(i) on the array A, the LA-vector uses a data structure that supports the operation rank efficiently (possibly in constant time) on a bit-vector of size n, which allows finding the segment <α, β> that covers i, and finally returns the value $\lfloor \alpha i+\beta \rfloor+C[i]$.

To implement operation rank(x) on the array A, LA-vector performs a kind of binary search that exploits the information encoded in the piecewise linear ε-approximation.

Although the input consists of an array A of strictly increasing values, there may be significant repetition in the differences between consecutive elements of A. The piecewise linear ε-approximations do not have the ability to find and exploit this type of repetitiveness.

Consider then the string S[1, n] defined as S[i]=A[i]−A[i−1], with A[0]=0, and suppose that the sub-string S[i,j] was previously encountered at S[i', i'+j−i], with i'<i. Therefore, it is possible to write S[i,j]=S[i', i'+j−i]. Instead of finding a new sequence of segments that approximate the sub-array A[i, j] as described above, it is possible to use, for that part of the array, the segments that approximate the sub-array A[i', j'] properly shifted to the right. Even if A[i', j'] is covered by many segments, the same shift will transform these segments into an approximation for A[i, j], thus requiring significantly less space than the one needed by the explicit representation of the many segments, as is the case with the LA-vector.

A new data structure, obtained by applying the process just described above, resolves the above limitations of the LA-vector by orchestrating the piecewise linear ε-approximations on the array A with the block tree data structure on the string S and is therefore called the block-ε tree.

Initially, a block tree structure is constructed on the string S (as specified in the work of Belazzougui, Caceres, Gagie et al. mentioned above), in which each node implicitly represents the corresponding sub-array of A through the differences of its adjacent elements stored in the string S. Subtrees of the block tree may be absent as they encode repeated substrings of the string S. Subsequently, this tree is further "pruned" to eliminate sub-trees that can be represented more succinctly by compression strategies and, in detail, whose corresponding sub-array of A can be represented more succinctly by segments and corrections, i.e., whose LA-vector representation is more succinct than the block tree representation.

Compared to a LA-vector constructed on A, the block-ε tree does not encode the segments and corrections corresponding to the substrings of S that have already been previously encountered. Therefore, it exploits the repetitiveness of S to compress the piecewise linear ε-approximation at the basis of an LA-vector.

Compared to the classical block tree, the block-ε tree eliminates subtrees whose substrings can be encoded more efficiently by segments and corrections, i.e., thus exploiting the approximate linearity of sub-arrays of A.

The following describes in more detail the structure of a block-ε tree, and how to orchestrate this interaction to answer the queries select and rank.

Assume that $n=\delta 2^h$ for some integer h, where δ is the complexity of the string S (see Navarro: "Indexing Highly Repetitive String Collections, Part I: Repetitiveness Measures", ACM Computing Surveys, 2022).

The block-ε tree data structure is organized in h'≤h levels, resulting from the h repetitions of the step (d) of the process, and the subsequent "pruning", carried out in the steps (e)-(f), which causes the removal of the h−h' lower levels of the tree structure. The first level, called level zero, is created in the step (a) by dividing the string S into δ blocks of length $s_0=n/\delta$. The blocks at level l will have length $s_l=n/(\delta 2^l)$ because they will be obtained in the step (c) by halving the blocks of the previous level until reaching the last level $$h = \log \frac{n}{\delta}$$

where, as commented in step (d), the blocks have lengths $s_h=1$.

At any level, in the step (b), if two blocks $S_q$ e $S_{q+1}$ are consecutive in S and form the leftmost occurrence in S of their contents, then both $S_q$ and $S_{q+1}$ are marked. A block $S_r$ unmarked becomes a leaf in the tree because, by construction, its content also appears in an earlier position of S and so it is possible to encode it succinctly by storing, again in the step (b), a pointer q to the marked blocks $S_q$, $S_{q+1}$ at the same level l containing its leftmost occurrence, at the cost of $$\log \frac{n}{s_l} = \log(\delta 2^l)$$

bits, and storing the offset o of $S_r$ with respect to the beginning of the block $S_q$ at a cost of log $s_l$ bits (for simplicity, we are omitting the ceiling functions from the space occupancy). Thus, the space occupancy of this "double" pointer is log n bits. Furthermore, to retrieve the values of A corresponding to $S_r$, the difference Δ between the value of A corresponding to the beginning of $S_r$ and the value of A at the previous occurrence of $S_r$ has to be stored by using log u bit. Overall, each unmarked block requires log n+ log u bits of space.

Instead, a marked block $S_q$ that is not in the last level of the tree structure becomes an internal node of the tree. In fact, in the step (c), the block $S_q$ is split into two sub-blocks of equal length (given the hypothesis of our example), thus generating an internal node with two children.

To describe the pruning process mentioned above, a cost function c is defined in step (e) on the nodes of the block-ε tree.

For an unmarked block $S_r$, the cost is defined as $c(S_r)=\log n+\log u$, which takes into account the space in bits occupied by q, o, and Δ.

For a marked block $S_q$ at the last level h, the cost is defined as $c(S_q)=\log u$, which takes into account the space in bits occupied by its corresponding element of A. For the last case, let $S_q$ be a marked block at level l<h, and therefore $S_q$ is an internal node of the tree. Assume that the elements of A represented by this block may be approximated by a segment with error $\varepsilon_q \leq \varepsilon$. Assume further that $\varepsilon_q$ is minimal, i.e., there is no $\varepsilon'<\varepsilon_q$ such that there exists a segment that approximates with error ε' those same elements of A. Let $y=\log(2\varepsilon_q+1)$ be the space in bits required to store a correction, and be κ the space in bits occupied by the parameters <α, β> of the segment, hence κ=2 log u+log n if β is encoded in log u bits and α is encoded as a rational number with a numerator stored in log u bits and a denominator stored in log n bits (indeed, other encodings, even entropic encodings of the parameters would be possible and would induce other trade-offs in time and space). The block $S_q$ is therefore assigned a cost $c(S_q)$ defined recursively as:

$$c(S_q) = \min \begin{cases} \kappa + s_l y + \log \log u \\ 2 \log n + \sum_{S_x \in child(S_q)} c(S_x) \end{cases}$$

The first branch of the equation represents an encoding of the sub-array of A corresponding to $S_q$ via a segment with error $\varepsilon_q$, corrections of y bits for each of the $s_l$ elements in $S_q$, and the value of y, respectively.

The second branch of the equation represents an encoding that recursively divides $S_q$ into two children. Finally, if there is no segment with error ε (and therefore there is no $\varepsilon_q$ with $\varepsilon_q \leq \varepsilon$) for $S_q$, one assigns to that $S_q$ the cost indicated in the second branch of the equation.

A post-order visit of the tree defined by the block-ε tree is sufficient to perform the steps (e)-(f) simultaneously, i.e., to assign a cost to the nodes of the tree, possibly prune some of its subtrees, and encode the content of the blocks according to the chosen compression strategy (in this case LA-vector, but in general it could be any strategy chosen from a plurality of known or specially designed ones, and possibly different at each block). In particular, when returning from recursion on the two children of a marked block $S_q$ at level l, it is checked whether the first branch of the equation provides the minimum. If so, we prune the subtree rooted in $S_q$ and store the block encoding in its place via the parameters <α, β> and the $s_l$ corrections in an array $C_q$. Following this pruning, it is necessary to correct the destination of pointers that from an unmarked block $S_r$ point to a descendant (pruned) block of $S_q$. To do this, we first make sure that $S_r$ points to $S_q$. Furthermore, since any pointer always points to a marked pair of blocks, either both or only one of these two blocks belong to the pruned subtree. In the latter case, an additional pointer is required from $S_r$ to the block that does not belong to the pruned subtree. Overall, this produces a pruned tree with h'≤h levels.

As mentioned earlier, the block-ε tree can introduce various search algorithms in the phase (g) and, in particular, support the operations select and rank.

For the operation select(i), one follows the path starting from the zero-level block where the position i falls in and proceeds to a leaf block. There are the following four cases for a block visited at level l:

Case 1: The block is an unmarked block $S_r$ which stores a pointer q, an offset o and a difference value Δ=A[b]−A[a], where b is the position corresponding to the beginning of $S_r$ and a is the position corresponding to the beginning of the copy in $S_q$. First, we jump to either $S_q$ or $S_{q+1}$ depending on whether o+i−b<$s_l$. Then, we transform the operation select(i)=A[i] into Δ+select(a+i−b)=Δ+A[a+i−b].

Case 2: The block is a marked internal block. We proceed to the left or to the right child depending on whether i mod $s_l$<$s_l$/2, and continue calculating select(i).

Case 3: The block is a leaf marked block $S_q$ which stores the parameters <α, β> and local corrections $C_q$. In this case, we return ⌊αi+β⌋+$C_q$[i mod $s_l$].

Case 4: The block is a leaf marked block $S_q$ at the last level h, then we return the corresponding single element.

The time complexity of such a tree traversal is analyzed below. First, if a leaf block is encountered, the traversal ends. If an unmarked block is encountered, it follows its pointer to a block that may correspond to a marked leaf block or an internal block. In the latter case, the traversal proceeds to one of the children with a constant time cost for that level. Therefore, the time complexity of select(i) is O(h').

For the operation rank, a (possibly compressed) data structure is created that performs predecessor searches on the δ integers of A corresponding to the last elements of the zero-level blocks, i.e., the integers A[in/δ] for i=1, . . . , δ. For example, one can use the data structure presented by Belazzougui and Navarro in "Optimal lower and upper bounds for representing sequences", ACM Transactions on Algorithms 2015, which performs searches in time O(log $\log_w$ u/δ), where w is the size of the machine word. Furthermore, in each marked block $S_q$ in any level l, excluding the first and the last one, it is stored a sample of A corresponding to the last element of $S_q$ in order to descend in constant time to the correct child block. The operation rank(x) then begins with a predecessor search in the above structure, which indicates the zero-level block into which it falls x and then proceeds towards a leaf block. There are the following four cases for a block visited at level l:

Case 1: The block is an unmarked block $S_r$ which stores a pointer q, an offset o and a difference value Δ=A[b]−A[a]. First, the visit jumps to either $S_q$ or $S_{q+1}$ depending on whether x−Δ≤v, where v is the sample corresponding to the last element of $S_q$. Then we recursively perform an operation rank with argument x−Δ, and we then return b−a+rank(x−Δ). The offset b−a takes into account the jump to the left due to resolving the operation of rank not on $S_r$ but on $S_q$ or $S_{q+1}$.

Case 2: The block is a marked internal block. We proceed to the left or to the right child depending on whether x≤v, where v is the sample corresponding to the last element of the left child, and continue calculating rank(x).

Case 3: The block is a leaf marked block $S_q$ which stores the parameters <α, β> and local corrections $C_q$. A binary search is performed for x among the $s_l$ corrections stored in $C_q$. Using the algorithm from the above-mentioned article by Boffa, Ferragina and Vinciguerra, this search has a time cost of O(log $ε_q$) and returns the result of rank(x), which is the position in A of the (predecessor of the) value x.

Case 4: The block is a leaf marked block $S_q$ at the last level h, then the rank of the corresponding single element is returned.

Overall, the time complexity of the operation rank is given by the sum of the time costs of the initial predecessor search, the traversal of the block-ε tree and the final binary search, for a total time complexity of $$O\left(\log \log_w \frac{u}{\delta} + h' + \log \varepsilon\right).$$

By way of non-limiting example, some possible variations or specifications to the proposed data structure according to the outline of the proceedings should be noted, such as:

the use of a number of starting blocks other than the string complexity δ;

the use of a variable branching factor of said tree among levels and greater than two;

the use of blocks of variable length (at any level of the structure);

the use of linear or non-linear piecewise approximations that possibly guarantee different approximation errors at the nodes of said tree;

the use of non-linear models that also guarantee a maximum error ε, the use of other compressed indices or compressors in place of, or in addition to, LA-vectors, suitably designed or, in a preferred non-limiting example embodiment, chosen from: dictionary compressors (such as, in a preferred non-limiting realization example, compressors based on Lempel-Ziv parsing); statistical type compressors (such as, in a preferred non-limiting realization example, PPM, Huffman coding, Arithmetic coding, Range coding, Asymmetric Numeral Systems); compressors based on the Burrows-Wheeler transform (such as, in a preferred non-limiting realization example, bzip or bzip2); succinct codes for integers or lists of integers (such as, in a preferred non-limiting realization example, selectable from at least one of Elias gamma and delta codes, Interpolative code, PForDelta, variable-byte code); grammar-based compressors (such as, in a preferred non-limiting realisation example, Re-Pair);

the use of techniques that make it possible to store the topology of the tree and also the various pointers between the nodes in the proposed solution in a succinct or compressed manner;

the use of alternative definitions of the cost function c, possibly of a multi-criteria type, thus taking into account one or more computational resources or parameters other than just the occupied space (such as, in a preferred non-limiting realization example, efficiency of operations, energy consumption, the amount of data transferred between memory levels, etc.), or the frequency of access to this data, or any other set of parameters allowing further customization of the compression strategies according to the needs of the application or user, even by changing the compression strategy among the levels and among the blocks at these levels;

the support for dynamic operations of insertion, modification and deletion of elements from the data set through the use of buffers or logs, or even dynamization techniques based, in a preferred non-limiting realization example, on the split and merge of nodes which are typical of block structures (such as the B-tree);

the use of additional metadata associated with at least one of the blocks to enable the implementation of efficient search operations on the sequence of symbols such as, but not limited to, returning a single symbol at a given input position or a string of contiguous symbols, or returning the number of symbols that have a specific property and precede a given input position.

However, as already noted, the proposed process is applicable to general sequences, such as one-dimensional data (chosen, in a preferred non-limiting example, from time series, text, postings list, memory location offsets), or multi-dimensional data (chosen, in a preferred non-limiting example from matrixes or images) transformed into a sequence of symbols in some manner such as, but not limited to, by arranging the elements row by row or column by column, or through space-filling curves (chosen, in a preferred non-limiting example, among the Z curve, Hilbert curve, Morton curve, etc.). Access and any specific searches for a given sequence of symbols can be efficiently supported by visiting the tree resulting from the process, possibly by exploiting additional metadata previously stored and associated with specific blocks.

With reference to the string X[1, n] of symbols from an alphabet E, mentioned above, we note the following. The operations $rank_a(i)$, which returns the number of occurrences of the symbol a in the string X[1, i], e $select_a(j)$, which returns the position of the j-th occurrence of the symbol a in X, can easily be realized from the above and from the article by Belazzougui, Caceres, Gagie et al. mentioned above and applied to the data structure resulting from the above process.

The process according to the invention achieves important advantages.

In fact, it is able to exploit both the repetitiveness of the data, their approximation according to linear or more complex functions, and the effectiveness of a multiplicity of compressors, to achieve better compression of the input data without sacrificing the time efficiency of the query operations supported on them and described above. The process is flexible and, for example, allows compression strategies to be adopted within it that are also developed at a later date and/or by third parties without penalizing the efficiency and effectiveness of the process.

The invention is also aimed at providing a program capable of being executed by a computer or by a data processor or other means capable of implementing the process, this program comprising instructions to command the execution of the steps of a process of the invention. This program can use any programming language whatsoever and can be in the form of source code, object code or intermediate code between source code and object code such as in a partially compiled form or in any other desirable form whatsoever. The invention is also aimed at providing an information carrier or medium readable by a data processor, and comprising instructions of a program as mentioned here above. The information medium can be any entity or communications terminal whatsoever capable of storing the program. For example, the medium can comprise cloud storage or a storage means such as a ROM, for example, a CD ROM or microelectronic circuit ROM or again a magnetic recording means, for example a hard disk drive.

Besides, the information support can be a transmissible support such as an electrical of optical signal, that can be conveyed by an element or optical cable, by radio or by other means. The program can be downloaded from an Internet type network or other network. As an alternative, the information carrier can be an integrated circuit into which the program is incorporated, the circuit being adapted to execute or to be used in the execution of the process in question.

According to one embodiment, the proposed technique is implemented by means of software and/or hardware components. In this respect, the term "module" can correspond in this document equally well to a software component and to a hardware component or to a set of hardware and software components. A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc). In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc. Each component of the system described here above can of course implement its own software components. The different embodiments mentioned here above can be combined with one another to implement the proposed technique.

The invention is susceptible to variations within the inventive concept as defined by the claims.

Here, all details can be replaced by equivalent elements and the materials, shapes and sizes can be any.

The invention claimed is:

1. A compression and search process on a data set based on multiple strategies, executed by a data processor of a computing device, comprising:
   extracting a set of raw data from a source,
   selecting said raw data by eliminating any errors and obtaining a sequence of symbols,
   manipulating said sequence of symbols by combining data structures and at least one compression strategy to obtain compressed and efficiently searchable data,
   recording these compressed and efficiently searchable data on storage media,
   wherein said manipulating said sequence of symbols to obtain said compressed and efficiently searchable data comprises the following steps:
   (a) organizing said sequence of symbols into blocks identifiable as sub-sequences of said sequence;
   (b) deleting one or more of said blocks whose content is a copy of some other sub-sequence of said sequence of symbols, and storing an association between deleted block and sub-sequence having the same content;
   (c) dividing each of said remaining blocks into sub-blocks, of a predefined or variable length, replacing said block with a parent-child relationship between the block and its sub-blocks to derive a tree data structure, (d) considering the sub-blocks obtained in the previous step (c) as blocks and repeating steps (b)-(c) until all remaining blocks reach a given length;

(e) for each block of any length created in said steps (a)-(d), evaluating a cost function defined in terms of said block itself, said sub-blocks descending from it, and at least one compression strategy applicable to the content of said block or the content of said sub-blocks descending from said block;

(f) pruning and further compressing said tree data structure in order to optimize the cost assessed in step (e), by compressing some of said blocks with at least one compression strategy, and consequently eliminating all said sub-blocks descending from said compressed blocks; and (g) providing algorithms to access and search the compressed representation of said sequence of symbols via the association of said step (b), said parent-child relationship of said phase (c), and the decompression strategies provided by the compression strategies chosen in phase (f).

2. A compression and search process on a data set based on multiple strategies, executed by a data processor of a computing device, comprising:

extracting a set of raw data from a source, selecting said raw data by eliminating any errors and obtaining a sequence of symbols, manipulating said sequence of symbols by combining data structures and at least one compression strategy to obtain compressed and efficiently searchable data, and recording these compressed and efficiently searchable data on storage media, wherein said manipulating said sequence of symbols to obtain said compressed and efficiently searchable data comprises the following steps:

(a) organizing said sequence of symbols into blocks identifiable as sub-sequences of said sequence;

(b) deleting one or more of said blocks whose content is a copy of some other sub-sequence of said sequence of symbols, and store an association between deleted block and sub-sequence having the same content;

(c) dividing each of said remaining blocks into sub-blocks, of a predefined or variable number, and of a predefined or variable length, replacing said block with a parent-child relationship between the block and its sub-blocks to derive a tree data structure, adopting techniques that allow for the storage of this derived tree data structure topology and corresponding parent-child relationships in a succinct or compressed manner;

(d) considering the sub-blocks obtained in the previous step as blocks and repeating steps (b)-(c) until all remaining blocks reach a given length;

(e) for each block of any length created in said steps (a)-(d), evaluating a cost function defined in terms of said block itself, said sub-blocks descending from it, and at least one compression strategy applicable to the content of said block or the content of said sub-blocks descending from said block;

(f) pruning and further compressing said tree data structure in order to optimize the cost assessed in step (e), by compressing some of said blocks with at least one compression strategy, different among each said block, and consequently eliminating all said sub-blocks descending from said compressed blocks;

(g) providing algorithms to access and search the compressed representation of said sequence of symbols via the association of said phase (b), said parent-child relationship of said phase (c), and the decompression strategies provided by the compression strategies chosen in phase (f).

3. The process according to claim 2, wherein the cost function in said step (e) may be multi-criteria and takes into account at least one computational resource, the frequency of access to sub-sequences, or any other set of parameters that allows for further customization of the compression strategies according to the needs of the application or user.

4. The process according to claim 2, wherein said tree data structure is extended with additional metadata associated with at least one of said blocks to enable efficient search operations on said sequence of symbols.

5. The process according to claim 1, in which metadata, algorithms and data structures are introduced to allow insertion, deletion and modification of symbols in said sequence of symbols.

6. The process according to claim 1, wherein said compression strategies comprise at least one of: dictionary compressors; statistical compressors; compressors based on the Burrows-Wheeler transform, succinct codes for integers or sequences of integers; compressors based on grammars; or LA-vector type compressors in which the approximation function is piecewise linear or non-linear.

7. The process according to claim 1, wherein said sequence of symbols is obtained from one-dimensional or multi-dimensional data selected from at least one of time series, text, postings list, memory location offsets, matrixes or images transformed into a sequence.

8. The process according to claim 1, wherein said sequence of symbols represents a string $X[1,n]$ of symbols drawn from an alphabet $\Sigma$; and wherein said compressed and efficiently searchable data supports the following operations: retrieving individual symbols or sequences of contiguous symbols in X, operation rank a (i) which returns number of occurrences of the symbol a in $X[1,i]$, and select a(j), which returns position of j-th occurrence of symbol a in X.

9. The process according to claim 1, wherein said sequence of symbols represents an ordered dictionary A of n distinct integers; and wherein said compressed and efficiently searchable data supports the following operations: rank(x), which returns number of elements in A which are less than or equal to x, and select(i), which returns i-th smallest element in A.

10. The process according to claim 9, wherein said sequence represents a string $S[1,n]$ obtained from said ordered dictionary $A[1,n]$ as $S[i]=A[i]-A[i-1]$, with $A[0]=0$; and wherein said compressed and efficiently searchable data support said operations rank and select on said elements of A.

11. A data processing system comprising a data processor of a computing device capable of implementing a process according to claim 1.

12. A computer comprising a computer program comprising instructions which, when executed by a data processor of said computer, enable said computer to perform a process according to claim 1.

13. A computer-readable storage media comprising instructions which, when executed by said computer, enable said computer to perform a process according to claim 1, wherein the computer storage medium comprises non-transitory computer readable medium.

14. A computer device comprising instructions which, when executed by said computer device, enable said computer device to perform a process according to claim 1, and at least one processor and at least one memory including computer program code, the at least one memory and the computer program code configured to, with the at least one processor, cause the computer device to perform the process.

15. The process according to claim 3, wherein said tree data structure is extended with additional metadata associated with at least one of said blocks to enable efficient search operations on said sequence of symbols.

16. The process according to claim 1, wherein the cost function in said step (e) may be multi-criteria and takes into account at least one computational resource, the frequency of access to sub-sequences, or any other set of parameters that allows for further customization of the compression strategies according to the needs of the application or user.

17. The process according to claim 1, wherein said tree data structure is extended with additional metadata associated with at least one of said blocks to enable efficient search operations on said sequence of symbols.

18. The process according to claim 16, wherein said tree data structure is extended with additional metadata associated with at least one of said blocks to enable efficient search operations on said sequence of symbols.

\* \* \* \* \*